United States Patent [19]

Laing et al.

[11] 4,049,925
[45] Sept. 20, 1977

[54] SOLENOID CIRCUIT FOR PUSHBUTTON RELEASE IN TELEPHONES

[75] Inventors: Graham Stirling Laing; Shiro Tom Ito, both of London, Canada

[73] Assignee: Northern Electric Company Limited, Montreal, Canada

[21] Appl. No.: 638,306

[22] Filed: Dec. 8, 1975
(Under 37 CFR 1.47)

[51] Int. Cl.² .......................................... H04M 1/08
[52] U.S. Cl. .................................... 179/99; 179/1 HS
[58] Field of Search ............... 179/1 HS, 2 A, 90 K, 179/99, 164; 200/5 D, 5 E, 5 EA, 5 EB

[56] References Cited

U.S. PATENT DOCUMENTS

| | | | |
|---|---|---|---|
| 2,199,686 | 5/1940 | Beyland | 179/99 |
| 2,802,904 | 8/1957 | Lehr et al. | 179/99 |
| 3,601,559 | 8/1971 | Hineline | 179/99 |
| 3,903,070 | 9/1975 | Kunimine | 179/99 |

Primary Examiner—Kathleen H. Claffy
Assistant Examiner—Gerald L. Brigance
Attorney, Agent, or Firm—Sidney T. Jelly

[57] ABSTRACT

In a telephone unit having a plurality of line selection pushbuttons, normally released on replacement of the handset, an additional release switch is provided with associated circuitry, whereby when a speaker unit or "hands free" unit is attached, pushbuttons can be actuated by a solenoid, even though the handset is not removed. The normal hold button is altered to a momentary button, and the solenoid releases all depressed pushbuttons. An additional circuit is provided for preventing actuation of the solenoid and release of an actuated pushbutton on cessation of a call when an answering service module is connected.

5 Claims, 3 Drawing Figures

SOLENOID CIRCUIT FOR PUSHBUTTON RELEASE IN TELEPHONES

This invention relates to a solenoid circuit for pushbutton release in a telephone, and is particularly related to controlling the release of pushbuttons when auxiliary apparatus is used in conjunction with a telephone.

When a telephone in which selection of a line, or lines, is made by depressing a pushbutton, or pushbuttons, such as extension telephones in offices, stores and other positions, it is desired that all buttons be released on cessation of a call. While this is readily obtainable by a mechanical release mechanism actuated by the replacement of the handset, the addition of auxiliary apparatus, such as a "hands free" unit, where the hand set is not removed from the hook switch, and the use of an answering unit, can give rise to difficulties.

It is desirable to provide some form of button release which will be actuated by the normal return of the handset, when used, and yet will operate when the handset is not removed and a "hands free" unit is in use, the release actuated by depressing of the switching off button on the "hands free" unit.

When an answering service auxiliary apparatus is attached, it is necessary to prevent button release when the particular call is ended by the switching off of the apparatus after a call.

The invention will be readily understood by the following description of certain embodiments, by way of example, in conjunction with the accompanying drawings, in which.

Figure 1:
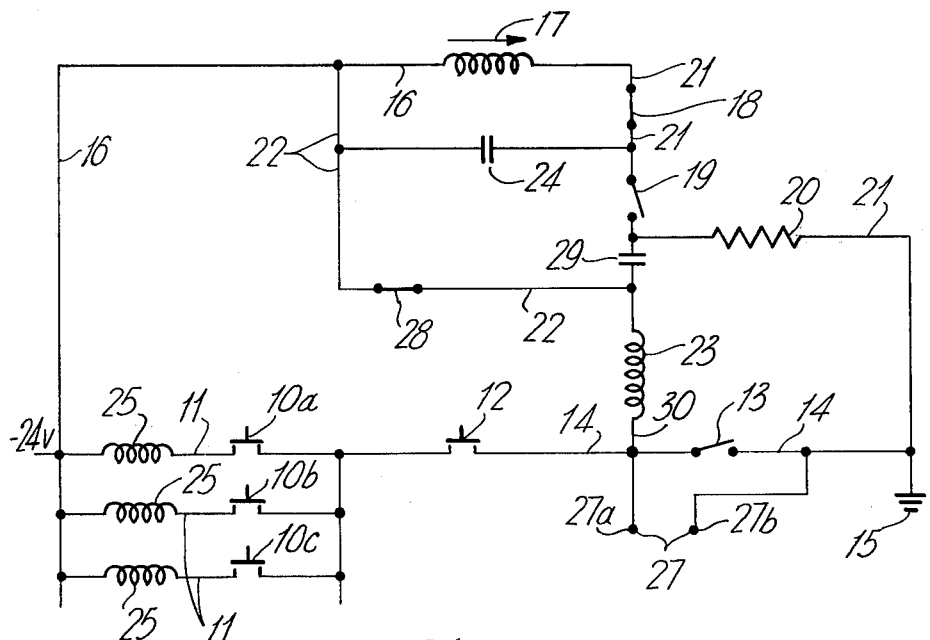
FIG. 1 is a circuit for use when using a "hands free" unit, or a headset unit, connected to a pushbutton set.

FIG. 1 illustrates a circuit for electrically releasing all pressed pushbuttons on replacing the handset on the hook switch. The normally open pushbutton switches are shown at 10a, 10b and 10c in the A leads 11. A hold button normally closed switch is indicated at 12 and the normally open hook switch at 13, in A1 lead 14 which connects to ground 15.

A connection 16 extends from the −24V supply to one connection of a solenoid 17, the other connection of the solenoid connected through normally closed switch 18, normally open switch 19, and resistor 20 to ground at 15 via a lead 21.

A further connection 22 is made between the −24V supply and the A1 lead 14, being connected to the lead 14 between the hold button switch 12 and hook switch 13, a relay coil 23 being in this connection and operative to actuate the switches 18 and 19. A capacitor 24 is connected between the lead 22 to the relay coil 23 and the lead 21 at a position between switch 18 and switch 19. The A relay coil is indicated at 25.

Connection to the "headset" switch and to a "hands free" unit switch are made at terminals 27a, 27b.

Operation is as follows. Considering as a starting point, the current controlling the relay A 25 is interrupted when switch 13 is opened, that is when the handset is on the switch hook. The handset is lifted and relay coil 23 is energized. Switch 19 closes and switch 18 opens, capacitor 24 charging through the resistor 20. On replacing the handset the relay coil 23 is de-energized, switch 19 opens and switch 18 closes, discharging capacitor 24 through the solenoid 17. Solenoid 17 actuates the latch bar of the key strip and releases any and all depressed buttons 10a, 10b, 10c.

In a conventional telephone set having a plurality of pushbuttons, the hold button releases any pushbutton which has been actuated. Only one button is normally actuated at any one time. The return spring in the hold button is only strong enough to release one button—by actuation of the latch bar. If two or more pushbuttons are actuated at one time—a condition which is deliberately provided under certain circumstances, the hold button spring is not strong enough to release the buttons. Installation of a stronger spring is not acceptable as it would necessarily be strong enough for the maximum number of buttons which could be actuated at one time. The force needed to actuate such a spring would be too high for normal use.

It is therefore arranged that solenoid 17 release all actuated buttons on actuation of the hold button. As illustrated in FIG. 1, the A relay 25 in the Key Telephone Unit must release before the tip and ring lines are broken, to place the key telephone unit in the "hold" condition. This requires that the relay 23 hold in until after the A relay has operated.

In the arrangement of FIG. 1, the hold button of the key strip is modified to a momentary button, and a second normally closed switch 28 is added. When the hold button is actuated switches 12 and 28 open. Relay 25 releases and relay 23 is held in by the capacitor 29, via the hook switch 13 and resistor 20. When capacitor 29 has discharged through the relay 23 and resistor 20, the relay 23 is de-energized, closing switch 18 to discharge capacitor 24 through the solenoid 17, releasing all buttons on telephone set. The hold button is depressed until the solenoid releases the buttons.

The use of a pushbutton telephone set in conjunction with an answering module requires that when the answering module goes off line after answering a call, the depressed button must not be released.

Figure 2:
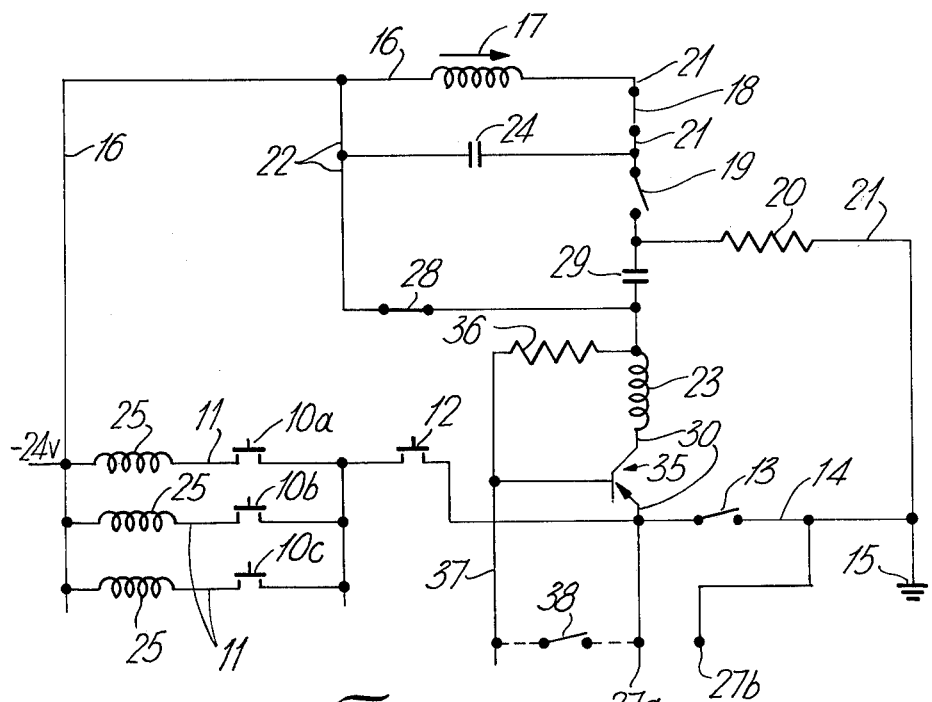
FIG. 2 is a modified circuit, for use in a pushbutton set when an automatic answering module is connected to the pushbutton set.

FIG. 2 illustrates a modification to the circuit of FIG. 1 to provide for answering service operation. Inserted in the lead 30 from relay 23 to lead 14 is a transistor 35, and bias resistor 36 is connected from the base of the transistor 35 to the junction of the relay coil 23 and lead 22. The emitter of the transistor 35 is connected to the lead 14. The collector of the transistor 35 is connected to the relay coil 23.

The transistor 35 and resistor 36 act to remotely control the relay 23 by a very short momentary closure of the control lead 37 to lead 14 by a remote switch 38. Typical values for the resistor 36 is 30K. A permanent closure of the control leads prevents the transistor from turning on, thus preventing relay 23 and solenoid 17 operation. This is the requirement for an automatic answer module, to prevent line button release after module answers a call.

The short line closure may be used to operate the relay 23 from a latch bar switch of another key.

Figure 3:
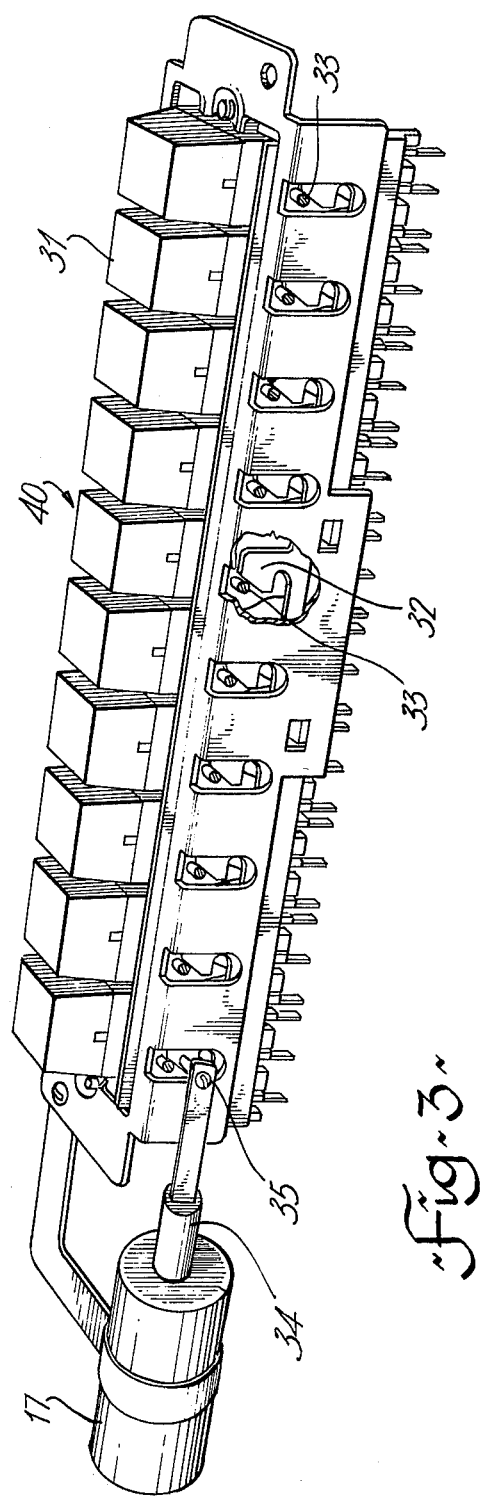
FIG. 3 is a perspective view of a pushbutton module with a button release solenoid.

FIG. 3 illustrates a pushbutton module 40 having a plurality of pushbuttons 31. The buttons are held in a depressed condition by a latch bar 32 which engages with projections 33, a projection on each button. The solenoid 17 is attached to the module and the armature 34 of the solenoid is connected to a short stub member 35 extending from the latch bar. Actuation of the solenoid 17 causes the armature to move, moving the latch bar and releasing any depressed buttons.

What is claimed is:

1. A pushbutton release circuit for a pushbutton telephone, comprising:
    a plurality of pushbuttons in a key strip and including a common button release latch bar;
    a first relay actuated by said pushbuttons;
    a hold button;
    a pushbutton release solenoid connected to said latch bar for actuation to release any depressed button;
    a second relay for actuating said solenoid; and for connection and disconnection of tip and ring lines in said telephone;
    a delay circuit for delaying actuation of said second relay until after actuation of said first relay;
    means actuated by said hold button to connect said delay circuit into the release circuit;
    actuation of said hold button connecting said delay circuit and releasing said first relay, the delay circuit energizing said second relay to actuate said solenoid after release of said first relay.

2. A circuit as claimed in claim 1, said second relay normally energized, said delay circuit comprising a normally closed switch in series with said second relay and one end of said solenoid, a capacitor in series with said relay and the other end of said solenoid, and a resistor in parallel with said capacitor and said relay, actuation of said hold button opening said switch, said capacitor discharging through said relay and said resistor, to delay de-energizing of said second relay, said second relay when de-energized actuating said solenoid.

3. A circuit as claimed in claim 2, including a further capacitor in parallel with said solenoid, and a further switch in series with and between said further capacitor and said solenoid, said second relay maintaining said further switch open when encrgized and closing said further switch on de-energization, to discharge said further capacitor through said solenoid.

4. A circuit as claimed in claim 1, including a bypass circuit in parrallel with said second relay, means for connecting an automatic answering module to said circuit, said bypass circuit connected to bypass said further relay on connection of said module to said circuit, whereby on completion of a call answer by said module, said second relay is retained in an energized condition and said solenoid remains unactuated.

5. A circuit as claimed in claim 4, said bypass circuit comprising a transistor in series with and connected to one end of said second relay and a resistor in parallel with said second relay, the resistor connected between the other end of said second relay and the base of the transistor.

* * * * *